(12) United States Patent
Miura et al.

(10) Patent No.: US 11,891,045 B2
(45) Date of Patent: Feb. 6, 2024

(54) POWER TRANSMISSION DEVICE FOR VEHICLE

(71) Applicant: NISSAN MOTOR CO., LTD., Yokohama (JP)

(72) Inventors: Yoshitaka Miura, Kanagawa (JP); Masato Koga, Kanagawa (JP); Takayuki Kagaya, Kanagawa (JP); Yuuki Nakajima, Kanagawa (JP); Katsunori Tanaka, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 521 days.

(21) Appl. No.: 17/274,587

(22) PCT Filed: Sep. 10, 2018

(86) PCT No.: PCT/JP2018/033497
§ 371 (c)(1),
(2) Date: Mar. 9, 2021

(87) PCT Pub. No.: WO2020/053939
PCT Pub. Date: Mar. 19, 2020

(65) Prior Publication Data
US 2022/0048494 A1    Feb. 17, 2022

(51) Int. Cl.
*B60W 20/20*     (2016.01)
*B60W 10/02*     (2006.01)
(Continued)

(52) U.S. Cl.
CPC ............. *B60W 20/20* (2013.01); *B60K 6/387* (2013.01); *B60K 6/442* (2013.01); *B60W 10/026* (2013.01);
(Continued)

(58) Field of Classification Search
CPC .... B60W 20/20; B60W 10/026; B60W 10/06; B60W 10/08; B60W 2510/081;
(Continued)

(56) References Cited

U.S. PATENT DOCUMENTS

2014/0379194 A1  12/2014  Imamura et al.
2016/0297292 A1  10/2016  Sato et al.
2020/0317040 A1  10/2020  Ogino et al.

FOREIGN PATENT DOCUMENTS

EP    2 353 912 A1      8/2011
EP    2674342 A1 *  12/2013 ............... B60K 6/48
(Continued)

*Primary Examiner* — Nga X Nguyen
(74) *Attorney, Agent, or Firm* — Foley & Lardner LLP

(57) ABSTRACT

A power transmission device of the present invention is a power transmission device for a vehicle, including: a generator configured to be driven by power of an internal combustion engine; a travel motor configured to be driven by electric power generated by the generator and to drive a drive wheels; and the drive wheels configured to be driven by the power of the internal combustion engine or power of the travel motor. The power transmission device includes: a first power transmission path configured to transmit power between the travel motor and the drive wheels; and a first clutch mechanism configured to allow or interrupt power transmission through the first power transmission path.

4 Claims, 13 Drawing Sheets

(51) Int. Cl.
  *B60W 10/06* (2006.01)
  *B60W 10/08* (2006.01)
  *B60K 6/387* (2007.10)
  *B60K 6/442* (2007.10)

(52) U.S. Cl.
  CPC ............ *B60W 10/06* (2013.01); *B60W 10/08* (2013.01); *B60W 2510/081* (2013.01); *B60W 2510/244* (2013.01); *B60W 2520/28* (2013.01); *B60W 2710/0644* (2013.01); *B60W 2710/081* (2013.01); *B60W 2710/244* (2013.01); *B60Y 2400/421* (2013.01)

(58) Field of Classification Search
  CPC ....... B60W 2510/244; B60W 2520/28; B60W 2710/0644; B60W 2710/081; B60W 2710/244; B60W 2520/10; B60W 2540/10; B60W 10/02; B60W 50/082; B60K 6/387; B60K 6/442; B60K 2006/4833; B60Y 2400/421; Y02T 10/62; Y02T 10/70; Y02T 10/72
  USPC .......................................... 701/123, 180, 192
  See application file for complete search history.

(56) References Cited

FOREIGN PATENT DOCUMENTS

| | | | |
|---|---|---|---|
| JP | 2009120043 A * | 6/2009 | ............... B60K 6/48 |
| JP | 2012-197077 A | 10/2012 | |
| JP | 2016-043909 A | 4/2016 | |
| JP | 2016-199157 A | 12/2016 | |
| JP | 2018-069947 A | 5/2017 | |
| JP | 2017-222199 A1 | 12/2017 | |
| WO | WO-2015173637 A1 * | 11/2015 | ............. B60K 23/00 |
| WO | WO 2017/217066 A1 | 12/2017 | |
| WO | WO-2018/037718 A1 | 3/2018 | |

* cited by examiner

POWER TRANSMISSION DEVICE FOR VEHICLE

TECHNICAL FIELD

The present invention relates to a power transmission device for a vehicle.

BACKGROUND ART

There is known a series hybrid vehicle that supplies electric power generated by a generator driven by an internal combustion engine to a travel motor directly or through a battery and travels by driving drive wheels by the travel motor. JP2012-197077A discloses a series hybrid vehicle including a power transmission path that directly transmits power of an internal combustion engine to drive wheels, and a clutch that allows or interrupts the power transmission through the power transmission path. In the document described above, it is disclosed that the drive wheels are directly driven by the power of the internal combustion engine in a range where the internal combustion engine is higher in efficiency than a travel motor, for example, during high speed travel.

SUMMARY OF INVENTION

However, the series hybrid vehicle of the document described above is configured such that the travel motor is rotated with the rotation of the drive wheels in a travel mode in which the drive wheels are directly driven by the power of the internal combustion engine. When the travel motor is rotated in this way, an induced electromotive force is generated so that the power generation resistance of the travel motor acts as a friction that impairs the rotation of the drive wheels. That is, the series hybrid vehicle of the document described above has a problem that the energy loss is generated due to the co-rotation of the travel motor in the travel mode in which the drive wheels are directly driven by the power of the internal combustion engine.

It is therefore an object of the present invention to provide a power transmission device that can suppress the energy loss in a travel mode in which drive wheels are directly driven by power of an internal combustion engine.

A power transmission device according to one embodiment of this invention is for a vehicle including: a travel motor configured to be driven by electric power generated by the generator and to drive a drive wheels; and the drive wheels configured to be driven by the power of the internal combustion engine or power of the travel motor. The power transmission device comprises: a first power transmission path configured to transmit power between the travel motor and the drive wheels; and a first clutch mechanism configured to allow or interrupt power transmission through the first power transmission path.

DESCRIPTION OF EMBODIMENTS

Embodiments of the present invention will be described below with reference to the drawings and so on.

First Embodiment

A first embodiment will be described with reference to FIGS. 1 to 6.

Figure 1:
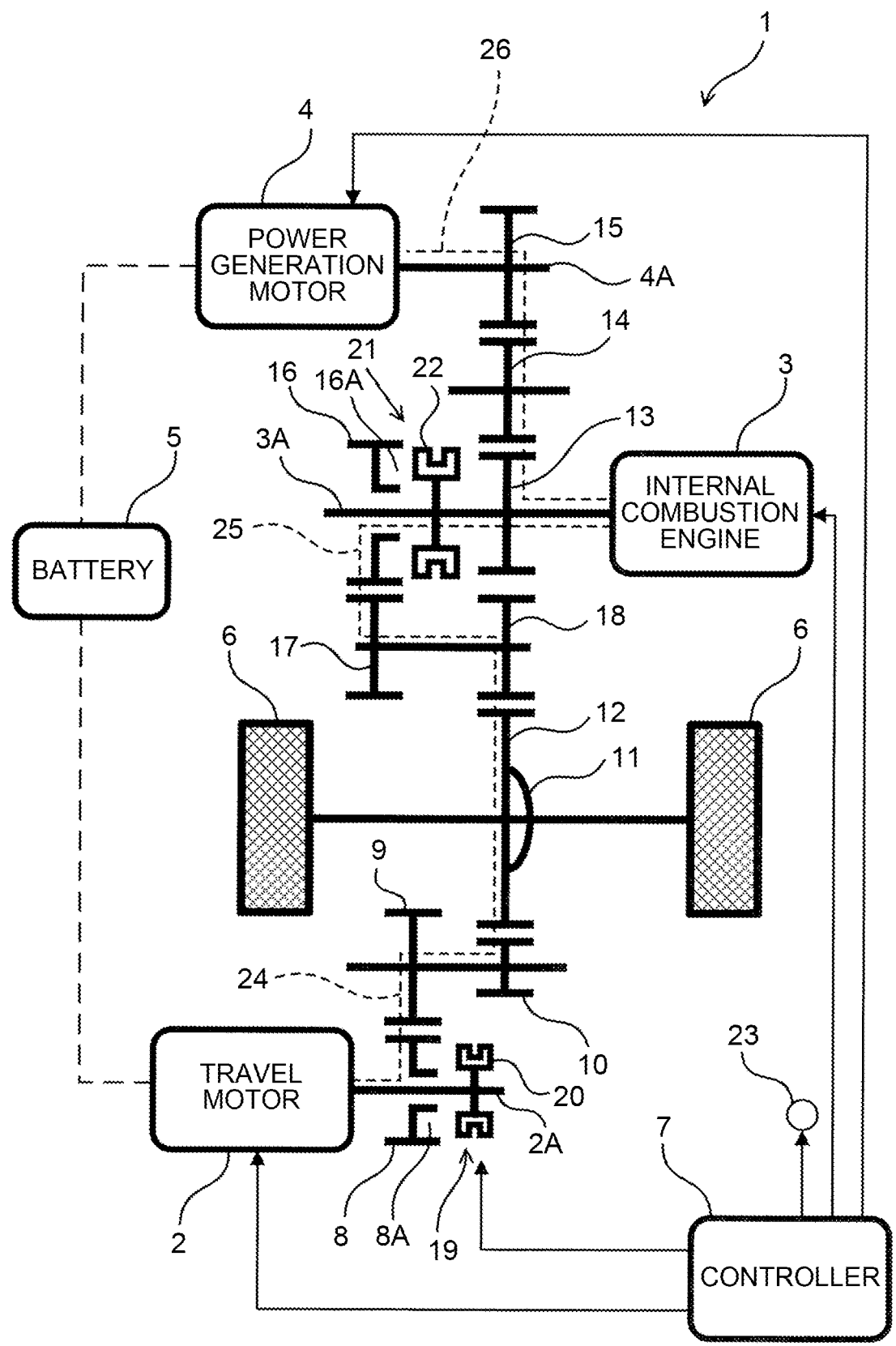
FIG. 1 is a schematic configuration diagram of a power transmission device for a vehicle.

FIG. 1 is a schematic configuration diagram of a power transmission device for a vehicle according to this embodiment. A vehicle 1 includes an internal combustion engine 3, a power generation motor 4, a battery 5, a travel motor 2, and a controller 7.

The internal combustion engine 3 may be either a gasoline engine or a diesel engine.

The power generation motor 4 is driven by power of the internal combustion engine 3 to generate electric power. The power generation motor 4 also has a function to perform power running by electric power of the battery 5 described later to motor the internal combustion engine 3.

The battery 5 is charged with the electric power generated by the power generation motor 4 and electric power regenerated by the travel motor 2 described later.

The travel motor 2 is driven by the electric power of the battery 5 to drive wheels 6. The travel motor 2 also has a so-called regenerative function to regenerate deceleration energy as electric power by being rotated with the rotation of the drive wheels 6 during deceleration or the like.

The controller 7 controls the travel motor 2, the internal combustion engine 3, and the power generation motor 4.

The controller 7 is formed by a microcomputer including a central processing unit (CPU), a read-only memory (ROM), a random access memory (RAM), and an input/output interface (I/O interface). The controller 7 may be formed by a plurality of microcomputers.

Further, the vehicle 1 includes a first power transmission path 24 that transmits the power between the travel motor and the drive wheels 6, a second power transmission path 25 that transmits the power between the internal combustion engine 3 and the drive wheels 6, and a third power transmission path 26 that transmits the power between the internal combustion engine 3 and the power generation motor 4.

The first power transmission path 24 is formed by a first reduction gear 8 provided around a rotary shaft 2A of the travel motor 2, a second reduction gear 9 meshing with the first reduction gear 8, a differential gear 12 provided to a differential case 11, and a third reduction gear 10 provided coaxially with the second reduction gear 9 and meshing with the differential gear 12. The first power transmission path 24 is provided with a first clutch mechanism 19 for switching between a state in which the first reduction gear 8 can be rotated relative to the rotary shaft 2A, and a state in which the first reduction gear 8 cannot be rotated relative to the rotary shaft 2A. The first clutch mechanism 19 is a so-called dog clutch including a first sleeve 20 supported slidably in the axial direction of the rotary shaft 2A, and an engaging part 8A provided to the first reduction gear 8. That is, when the first sleeve 20 is moved toward the first reduction gear 8 so that a plurality of convex portions provided to the first sleeve 20 so as to protrude toward the engaging part 8A and a plurality of convex portions provided to the engaging part 8A so as to protrude toward the first sleeve 20 are arranged alternately with each other in the rotation direction and engaged with each other, the first clutch mechanism 19 is in an engaged state. When the first sleeve 20 is moved away from the first reduction gear 8 in this state so that the convex portions of the both are disengaged from each other, the first clutch mechanism 19 is in a disengaged state. The movement of the first sleeve 20 is performed by an electric actuator.

When the first clutch mechanism 19 is in the engaged state, the power of the travel motor 2 is transmitted to the drive wheels 6. On the other hand, when the first clutch mechanism 19 is in the disengaged state, the rotation of the rotary shaft 2A of the travel motor 2 is not transmitted to the first reduction gear 8 so that the power transmission from the travel motor 2 to the drive wheels 6 is interrupted.

The second power transmission path 25 is formed by a fourth reduction gear 16 provided around an output shaft 3A of the internal combustion engine 3, a fifth reduction gear 17 meshing with the fourth reduction gear 16, the differential gear 12 provided to the differential case 11, and a sixth reduction gear 18 provided coaxially with the fifth reduction gear 17 and meshing with the differential gear 12. The second power transmission path is provided with a second clutch mechanism 21 for switching between a state in which the fourth reduction gear 16 can be rotated relative to the output shaft 3A, and a state in which the fourth reduction gear 16 cannot be rotated relative to the output shaft 3A. The second clutch mechanism 21 is a so-called dog clutch including a second sleeve 22 supported slidably in the axial direction of the output shaft 3A, and an engaging part 16A provided to the fourth reduction gear 16. That is, when the second sleeve 22 is moved toward the fourth reduction gear 16 so that a plurality of convex portions provided to the second sleeve 22 so as to protrude toward the engaging part 16A and a plurality of convex portions provided to the engaging part 16A so as to protrude toward the second sleeve 22 are arranged alternately with each other in the rotation direction and engaged with each other, the second clutch mechanism 21 is in an engaged state. When the second sleeve 22 is moved away from the fourth reduction gear 16 in this state so that the convex portions of the both are disengaged from each other, the second clutch mechanism 21 is in a disengaged state. The movement of the second sleeve 22 is performed by an electric actuator.

When the second clutch mechanism 21 is in the engaged state, the power of the internal combustion engine 3 is transmitted to the drive wheels 6. In the following description, this state will also be referred to as an internal combustion engine direct connection state. On the other hand, when the second clutch mechanism 21 is in the disengaged state, the rotation of the output shaft 3A of the internal combustion engine 3 is not transmitted to the fourth reduction gear 16 so that the power transmission from the internal combustion engine 3 to the drive wheels 6 is interrupted.

The third power transmission path 26 is formed by a seventh reduction gear 13 provided on the output shaft 3A of the internal combustion engine 3, an eighth reduction gear 14 meshing with the seventh reduction gear 13, and a ninth reduction gear 15 provided on a rotary shaft 4A of the power generation motor 4. The third power transmission path 26 does not include an element that interrupts the power transmission. That is, the third power transmission path 26 is always in a state where the power is transmitted.

The engagement and disengagement operations of the first clutch mechanism 19 and the second clutch mechanism 21 are controlled by the controller 7.

The vehicle 1 configured as described above is capable of switching between a series hybrid mode in which the vehicle 1 travels by transmitting the power to the drive wheels 6 through the first power transmission path 24, and an internal combustion engine direct connection mode in which the vehicle 1 travels by transmitting the power to the drive wheels 6 through the second power transmission path 25 in the internal combustion engine direct connection state. The controller 7 switches between the series hybrid mode and the internal combustion engine direct connection mode according to the driving state, specifically the vehicle speed and the driving force.

Figure 2:
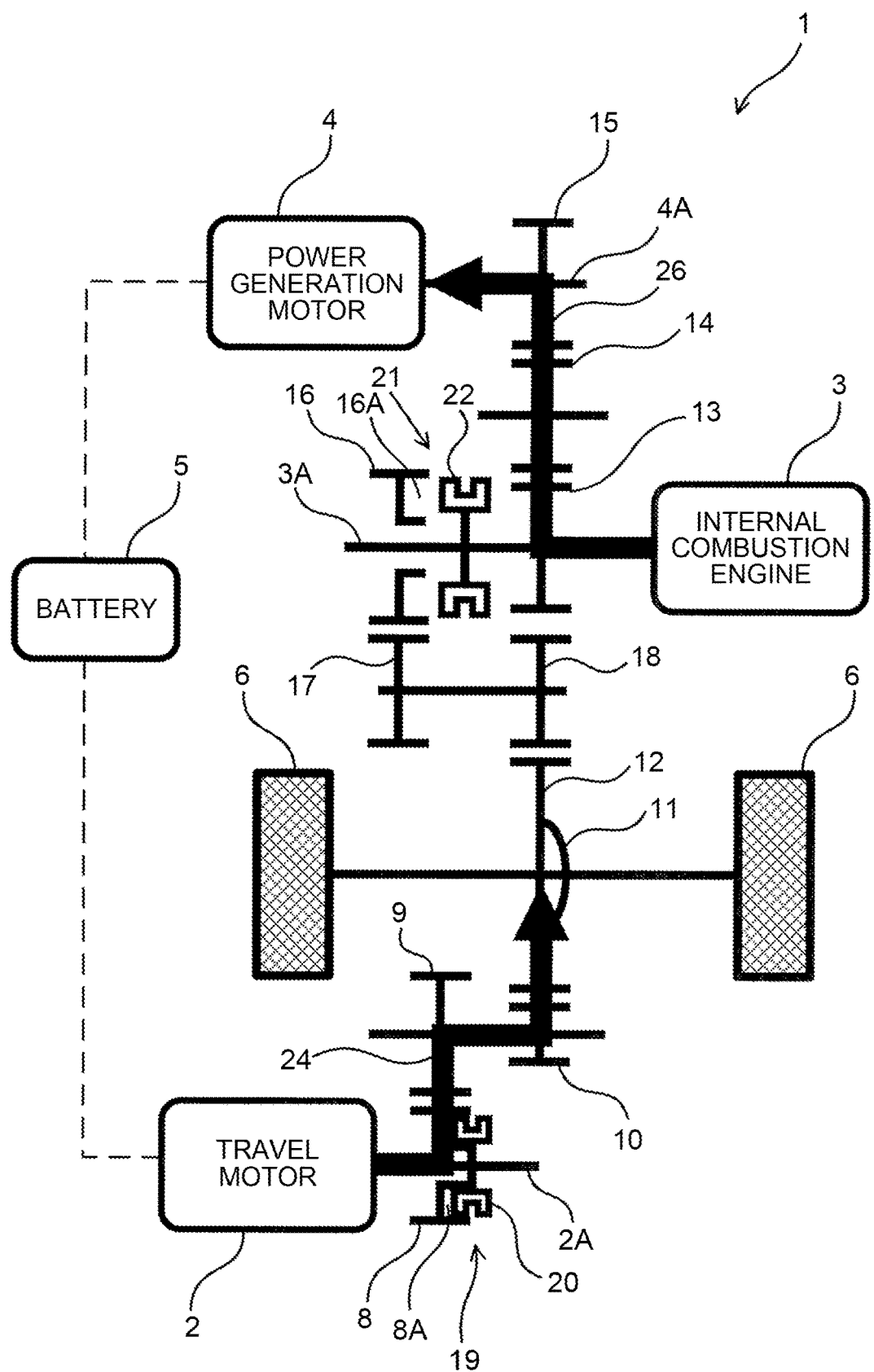
FIG. 2 is a diagram illustrating a power transmission state in a series hybrid mode.

FIG. 2 is a diagram illustrating a power transmission state in the series hybrid mode. In the series hybrid mode, the power is transmitted to the drive wheels 6 through the first power transmission path 24. That is, in the series hybrid mode, the first clutch mechanism 19 is in the engaged state so that the power generated by the travel motor 2 is transmitted to the drive wheels 6. In this event, the second clutch mechanism 21 is in the disengaged state.

Even in the series hybrid mode, the power of the internal combustion engine 3 is transmitted to the power generation motor 4 through the third power transmission path 26 to cause the power generation motor 4 to generate electric power, and the generated electric power is charged to the battery 5. Note that whether or not to cause the power generation motor 4 to generate electric power is determined according to the charge amount of the battery 5, and that when there is no need to charge the battery 5, the internal combustion engine 3 is stopped.

Figure 3:
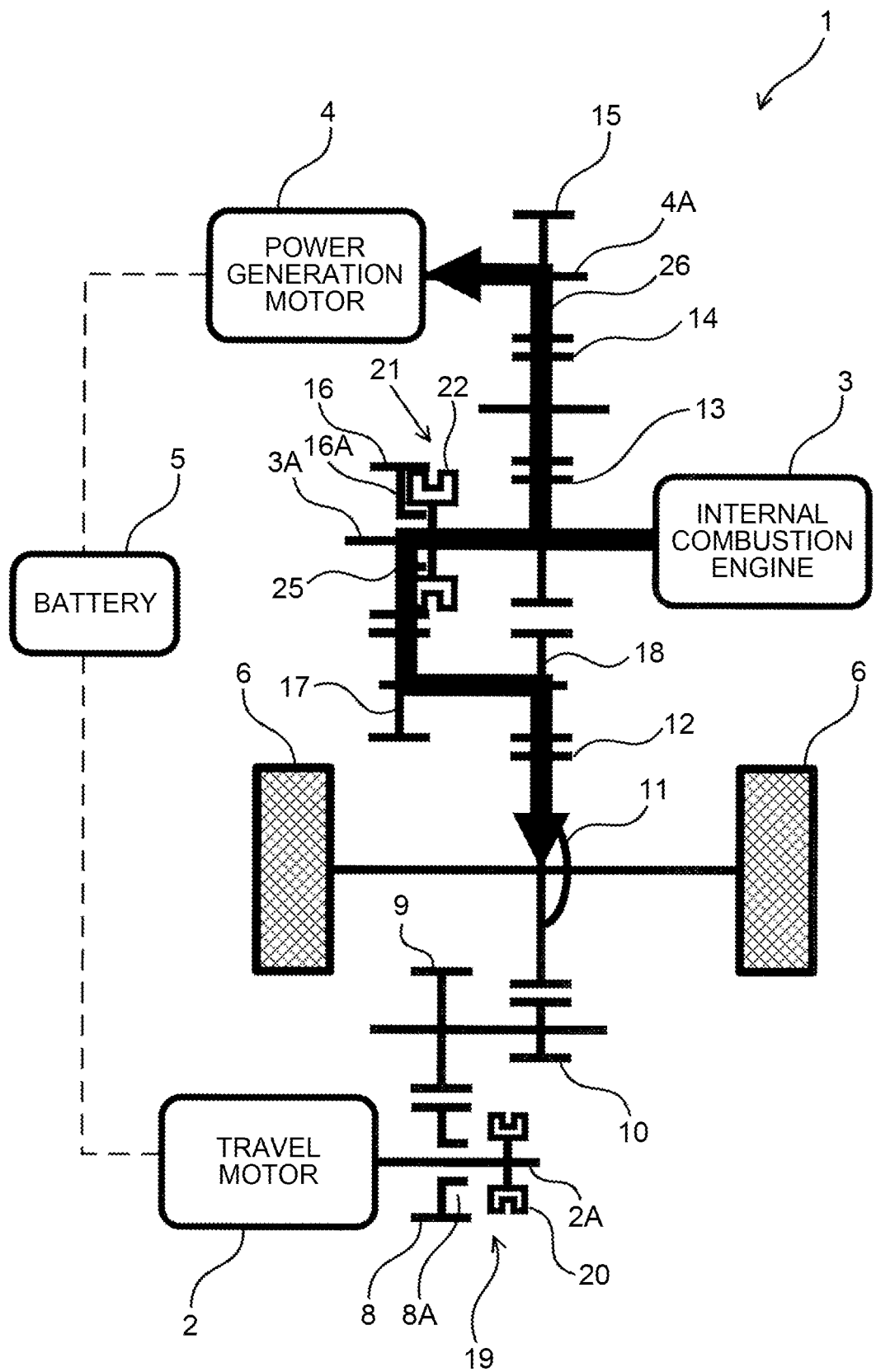
FIG. 3 is a diagram illustrating a power transmission state in an internal combustion engine direct connection mode.

FIG. 3 is a diagram illustrating a power transmission state in the internal combustion engine direct connection mode. In the internal combustion engine direct connection mode, the power is transmitted to the drive wheels 6 through the second power transmission path 25. That is, in the internal combustion engine direct connection mode, the second clutch mechanism 21 is in the engaged state so that the power generated by the internal combustion engine 3 is transmitted to the drive wheels 6.

In the internal combustion engine direct connection mode, the first clutch mechanism 19 is in the disengaged state. Assuming that the first clutch mechanism 19 is in the engaged state in the internal combustion engine direct connection mode, the travel motor 2 is rotated with the rotation of the drive wheels 6 to generate an induced electromotive force. When there is a margin in the charge capacity of the battery 5, generated electric power is charged to the battery 5 so that energy is regenerated. However, when there is no margin in the charge capacity of the battery 5, the power generation resistance acts as a friction to impair the rotation of the drive wheels 6, thereby causing a reduction in fuel efficiency. On the other hand, in this embodiment, since the first clutch mechanism 19 is in the disengaged state in the internal combustion engine direct connection mode, it is possible to suppress a reduction in fuel efficiency due to the co-rotation of the travel motor 2 described above.

In the meantime, dog clutches used as the first clutch mechanism 19 and the second clutch mechanism 21 in this embodiment are required such that it is necessary to rotationally synchronize an engaging element and an engaged element when switching from a disengaged state to an engaged state. For example, when switching from the internal combustion engine direct connection mode to the series hybrid mode, it is necessary to rotationally synchronize the first sleeve 20 as the engaging element and the first reduction gear 8 as the engaged element. As the time required for the rotation synchronization increases, the time required for switching the travel mode increases so that the drivability decreases.

Therefore, in this embodiment, the time required for the rotation synchronization is shortened by rotating the travel motor 2 while the internal combustion engine direct connection mode is implemented. Hereinafter, a description will be given of control of the rotation speed of the travel motor 2 in the implementation of the internal combustion engine direct connection mode.

Figure 4:
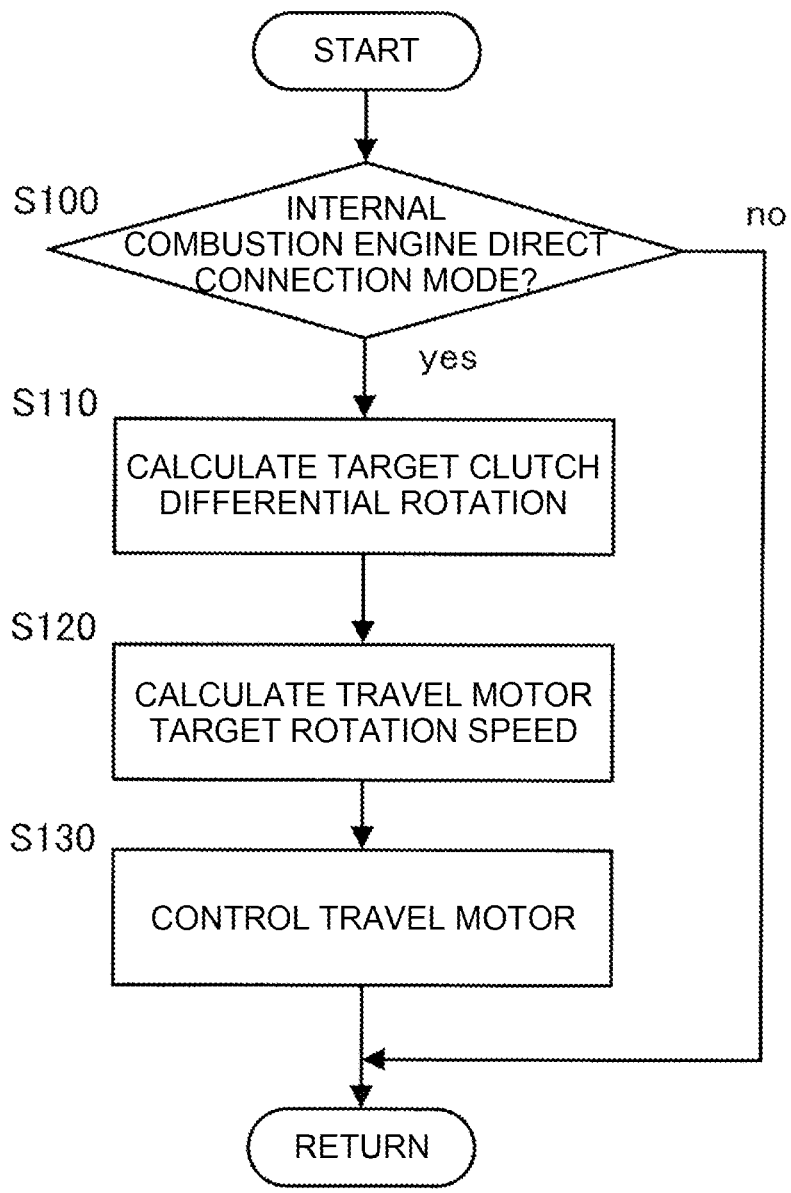
FIG. 4 is a flowchart illustrating a control routine for controlling the rotation speed of a travel motor while implementing the internal combustion engine direct connection mode.

FIG. 4 is a flowchart illustrating a control routine for controlling the rotation speed of the travel motor 2 in the implementation of the internal combustion engine direct connection mode. This control routine is programmed in the controller 7.

At step S100, the controller 7 determines whether or not the current travel mode is the internal combustion engine direct connection mode. When the current travel mode is the internal combustion engine direct connection mode, the controller 7 performs a process of step S110, and when the current travel mode is the series hybrid mode, the controller 7 ends the current routine. The controller 7 determines whether or not the current travel mode is the internal combustion engine direct connection mode, by searching a map of FIG. 5 using a current vehicle speed and a current driving force.

Figure 5:
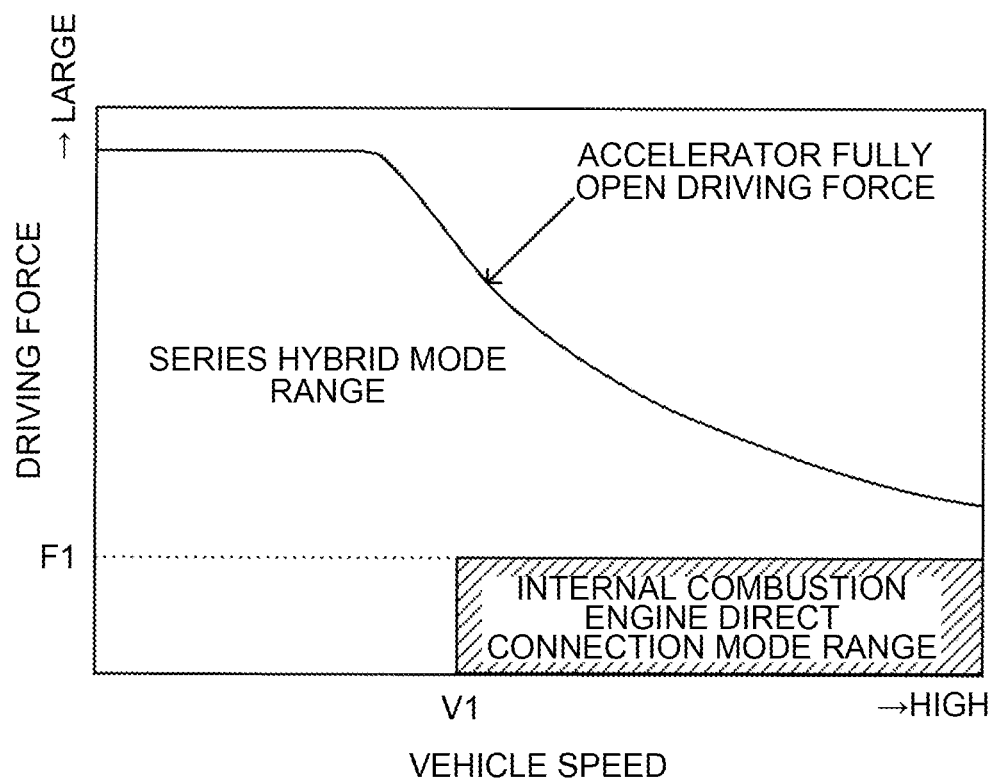
FIG. 5 is a map in which a travel mode is set per driving range.

FIG. 5 is a driving range map in which the horizontal axis represents the vehicle speed and the vertical axis represents the driving force. Accelerator fully open driving force indicated by a solid line in the figure represents a state in which the accelerator position (accelerator opening degree) is fully open. As illustrated in FIG. 5, a range in which the vehicle speed is equal to or higher than V1 and the driving force is equal to or less than F1 is an internal combustion engine direct connection mode range, and the other range is a series hybrid mode range.

The vehicle speed V1 is the lower limit vehicle speed at which when a comparison is made between the case of traveling by the power of the internal combustion engine 3 and the case of traveling by the power of the travel motor 2, the energy efficiency becomes higher in the case of traveling by the power of the internal combustion engine 3 than in the case of traveling by the power of the travel motor 2. Specifically, the vehicle speed V1 is determined according to the specifications of the internal combustion engine 3 and the travel motor 2 that are used. The vehicle speed can be detected by a non-illustrated vehicle speed sensor.

The driving force F1 is the maximum output of the internal combustion engine 3. Since the driving force is correlated with the accelerator position, a current driving force for use in the map search is calculated based on a current accelerator position. The accelerator position can be detected by a non-illustrated accelerator position sensor.

At step S110, the controller 7 calculates a target rotation speed difference of clutch. Specifically, the controller 7 calculates the target clutch differential rotation by searching a map of FIG. 6 using a current vehicle speed and a current charge amount (SOC: State Of Charge) of the battery 5. The target clutch differential rotation is a target value of the rotation speed difference between the sleeve 20 and the first reduction gear 8 in the first clutch mechanism 19.

Figure 6:
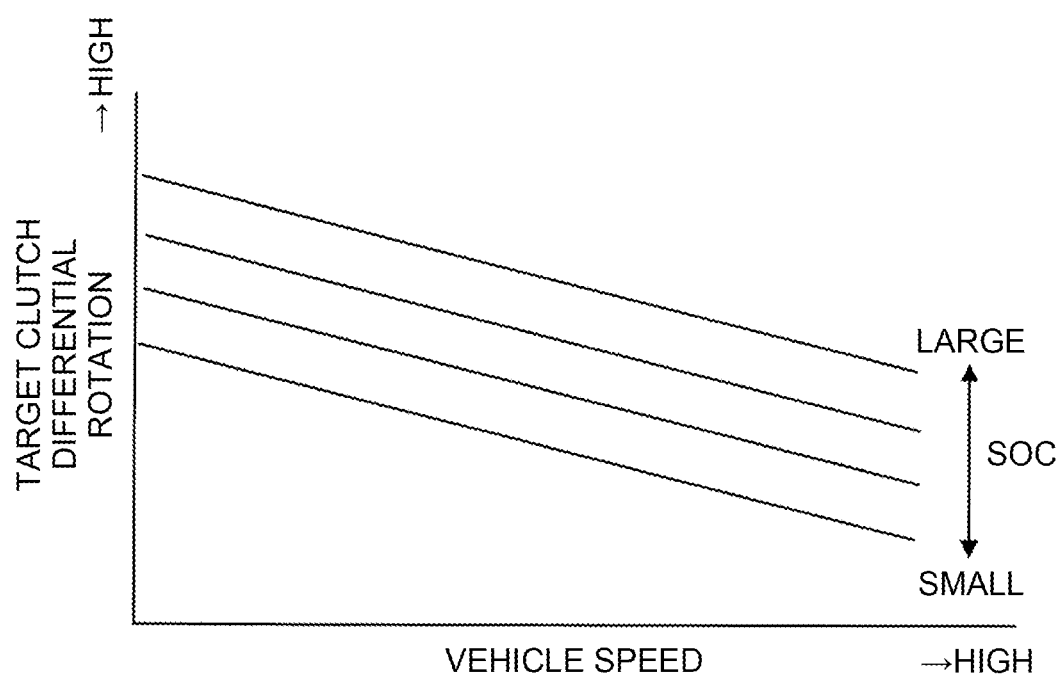
FIG. 6 is a map in which target rotation speed difference of clutch are set.

FIG. 6 is a map in which the horizontal axis represents the vehicle speed and the vertical axis represents the target rotation speed difference of clutch. The target rotation speed difference of clutch decreases as the vehicle speed increases. The reason for this is as follows. As the vehicle speed increases, the rotation speed of the first reduction gear 8 rotated by the drive wheels 6 increases. When the rotation speed difference is the same, the electric power required for the rotation synchronization, i.e. the electric power required for causing the rotation speed of the travel motor 2 to reach the rotation speed of the first reduction gear 8, becomes greater when the rotation speed of the first reduction gear 8 is high than when it is low. Therefore, in order to keep constant the electric power required for the rotation synchronization regardless of the vehicle speed, the target rotation speed difference of clutch is set to be smaller as the vehicle speed increases.

Further, the target rotation speed difference of clutch increases as the SOC of the battery 5 increases. This is because as the battery SOC increases, there is more margin of electric power that can be used for the rotation synchronization.

After calculating the target rotation speed difference of clutch at step S110, the controller 7 calculates a target rotation speed of the travel motor 2 at step S120. Specifically, the controller 7 sets as the target rotation speed of the travel motor 2 a value obtained by subtracting the target rotation speed difference of clutch from a rotation speed of the first reduction gear 8. The rotation speed of the first reduction gear 8 can be calculated based on a rotation speed of one of the rotary members located more on the drive wheel 6 side than the first clutch mechanism 19 in the first power transmission path 24. In this embodiment, the controller 7 calculates the rotation speed of the first reduction gear 8 based on a detection value of the vehicle speed sensor (not illustrated) that detects the rotation speed of the drive wheels 6, and the numbers of teeth of the differential gear 12, the third reduction gear 10, the second reduction gear 9, and the first reduction gear 8.

At step S130, the controller 7 controls the rotation speed of the travel motor 2 based on the target rotation speed calculated at step S120.

Next, the effects of this embodiment will be summarized.

The power transmission device of this embodiment includes the power generation motor 4 (the generator) driven by the power of the internal combustion engine 3, the travel motor 2 that is driven by the electric power generated by the power generation motor 4 and drives the drive wheels 6, and the drive wheels 6 driven by the power of the internal combustion engine 3 or the power of the travel motor 2. The power transmission device further includes the first power transmission path 24 that transmits the power between the travel motor 2 and the drive wheels 6, and the first clutch mechanism 19 that allows or interrupts the power transmission through the first power transmission path 24. Consequently, by disengaging the first clutch mechanism 19 when traveling in the internal combustion engine direct connection mode, it is possible to reduce the energy loss that is generated due to the rotation of the travel motor 2 caused by the rotation of the drive wheels 6.

The power transmission device of this embodiment further includes the second power transmission path 25 that mechanically transmits the power of the internal combustion engine 3 to the drive wheels 6, and the second clutch mechanism 21 that allows or interrupts the power transmission through the second power transmission path 25. Consequently, by disengaging the first clutch mechanism 19 and engaging the second clutch mechanism 21 during vehicle high speed travel or the like, the power of the internal combustion engine 3 can be directly transmitted to the drive wheels 6 without conversion to electricity so that it is possible to improve the fuel efficiency.

In the power transmission device of this embodiment, the third power transmission path 26 between the internal combustion engine 3 and the power generation motor 4 is always in the state where the power is transmitted. Consequently, when an increase request for driving force is generated during travel in the internal combustion engine direct connection mode, the assist for the driving force is immediately started by causing the power generation motor 4 to perform power running, and therefore, it is possible to quickly respond to the increase request.

The power transmission device of this embodiment further includes the controller 7 (the control unit) that controls the travel motor 2, the first clutch mechanism 19, and the second clutch mechanism 21. The controller 7 rotationally drives the travel motor 2 while implementing the internal combustion engine direct connection mode in which the drive wheels 6 are driven by the power of the internal combustion engine 3 in the disengaged state of the first clutch mechanism 19 and the engaged state of the second clutch mechanism 21. While it is necessary to synchronize the rotation speeds of the engagement elements (herein, the first sleeve 20 and the engaging part 8A) when engaging the first clutch mechanism 19, it is possible to shorten the time required for the synchronization by rotating the travel motor 2 in the internal combustion engine direct connection mode. As a result, the time required for switching from the internal combustion engine direct connection mode to the series hybrid mode is shortened.

In this embodiment, the controller 7 controls the rotation speed of the travel motor 2 in the implementation of the internal combustion engine direct connection mode within a range in which the rotation speed on the travel motor side of the first clutch mechanism 19 becomes lower than the rotation speed on the drive wheel side of the first clutch mechanism 19. Consequently, it is possible to suppress the electric power required for maintaining the rotation of the travel motor 2. More specifically, it is satisfactory if the controller 7 sets the difference between the rotation speed on the travel motor side and the rotation speed on the drive wheel side, i.e. the target rotation speed difference of clutch, within a range that can be allowed by the time required for increasing the rotation speed on the travel motor side to the rotation speed on the drive wheel side.

In this embodiment, the controller 7 controls the rotation speed of the travel motor 2 in the implementation of the internal combustion engine direct connection mode according to the vehicle speed. Consequently, it is possible to keep constant the time required for the rotation synchronization of the first clutch mechanism 19 regardless of the vehicle speed.

In this embodiment, the controller 7 controls the rotation speed of the travel motor 2 in the implementation of the internal combustion engine direct connection mode according to the state of charge of the battery Consequently, regardless of the electric power amount of the battery 5 that can be used for the rotation synchronization of the first clutch mechanism 19, it is possible to complete the rotation synchronization within an allowable time.

In the power transmission device of this embodiment, the first clutch mechanism 19 and the second clutch mechanism 21 are the dog clutches. Since the dog clutch has no drag resistance in a disengaged state compared to a friction clutch, the dog clutch is higher in efficiency correspondingly. Further, since the dog clutch does not need hydraulic pressure or the like for maintaining an engaged state compared to the friction clutch, it is possible to reduce the cost correspondingly.

Second Embodiment

A second embodiment will be described with reference to FIGS. 7 to 13.

The configuration of a power transmission device for a vehicle according to this embodiment is the same as the configuration of FIG. 1 described in the first embodiment.

This embodiment is also the same as the first embodiment in that the vehicle 1 travels by switching between the series hybrid mode and the internal combustion engine direct connection mode according to the driving state. However, in order to shorten the time required for the rotation synchronization of the first clutch mechanism 19 when switching from the internal combustion engine direct connection mode to the series hybrid mode, the travel motor 2 is constantly rotated in the implementation of the internal combustion engine direct connection mode in the first embodiment, but another method is used in this embodiment. Hereinafter, the difference from the first embodiment will be mainly described.

Figure 7:
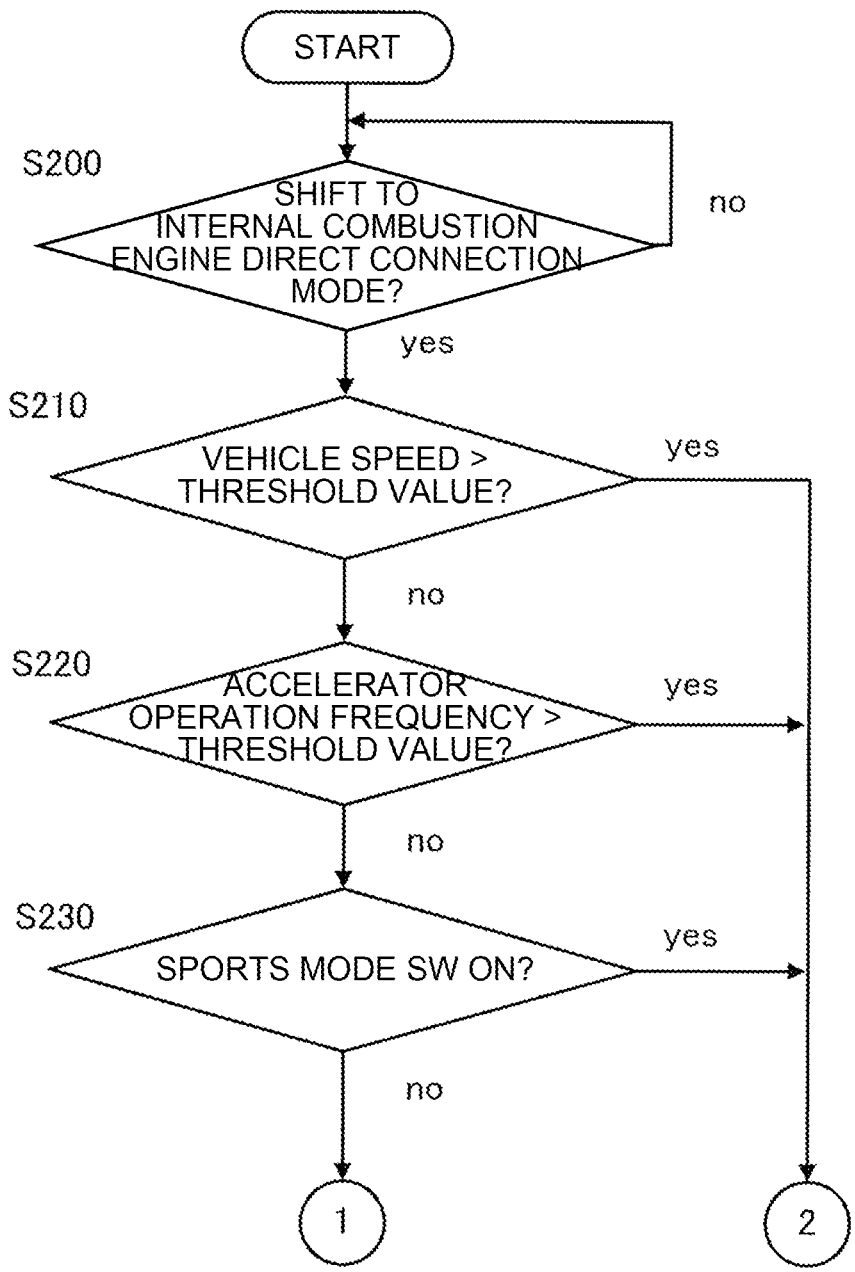
FIG. 7 is a part of a flowchart illustrating a control routine for switching from the series hybrid mode to the internal combustion engine direct connection mode.
Figure 8:
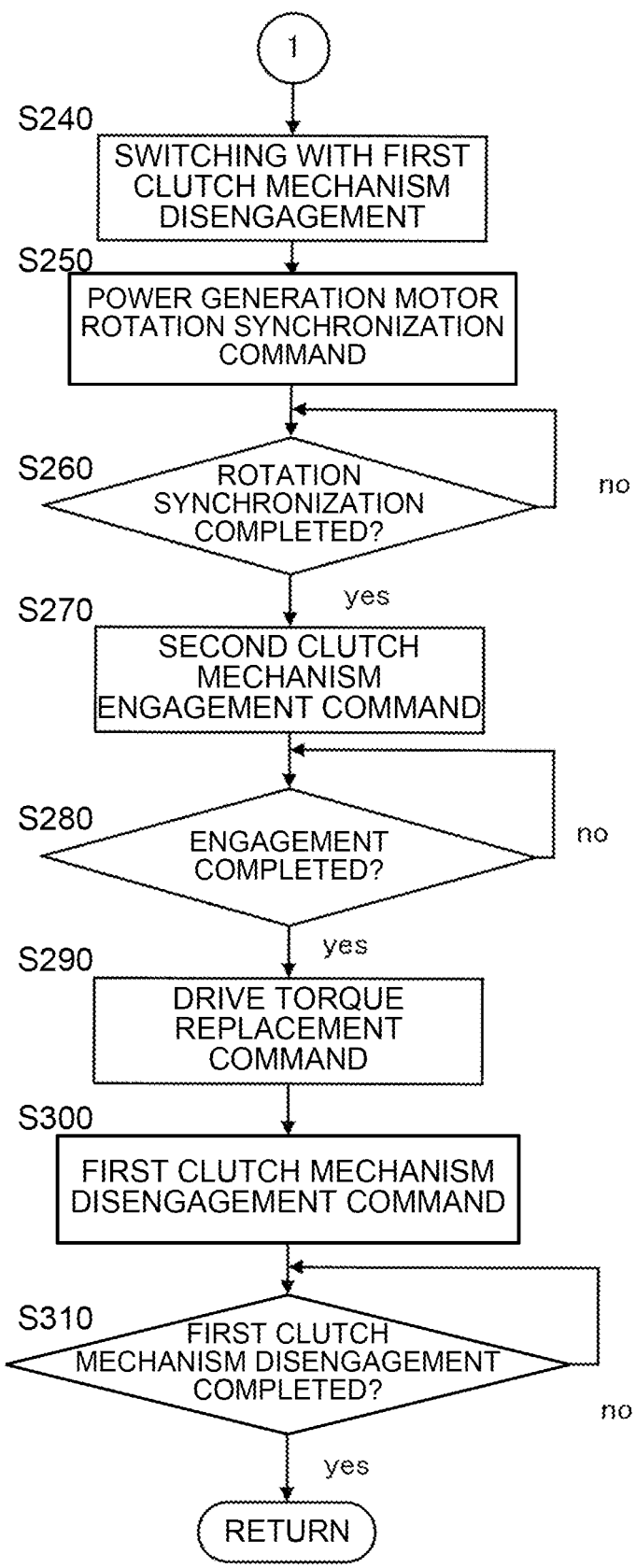
FIG. 8 is another part of the flowchart illustrating the control routine for switching from the series hybrid mode to the internal combustion engine direct connection mode.
Figure 9:
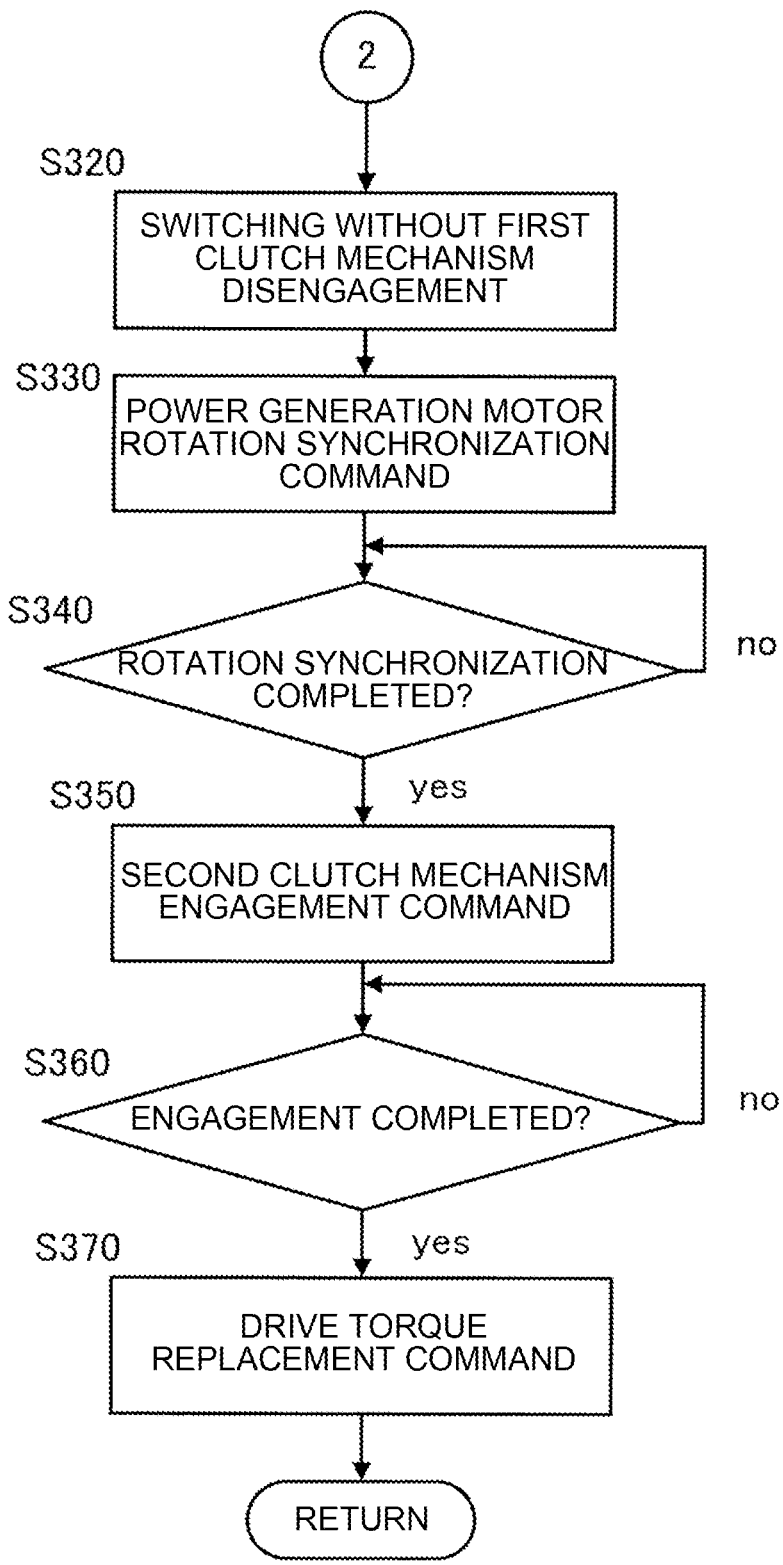
FIG. 9 is still another part of the flowchart illustrating the control routine for switching from the series hybrid mode to the internal combustion engine direct connection mode.

FIGS. 7 to 9 are a flowchart illustrating a control routine for switching from the series hybrid mode to the internal combustion engine direct connection mode. This control routine is programmed in the controller 7.

In this control routine, when the time required for the rotation synchronization of the first clutch mechanism 19 at the time of returning to the series hybrid mode becomes long enough to impair the drivability, or when there is a high possibility of returning to the series hybrid mode in a short time, the first clutch mechanism 19 is kept engaged even in the implementation of the internal combustion engine direct connection mode. When the first clutch mechanism 19 is disengaged in the implementation of the internal combustion engine direct connection mode, the control routine of FIG. 8 is performed following the control routine of FIG. 7, and when the first clutch mechanism 19 is kept engaged, the control routine of FIG. 9 is performed following the control routine of FIG. 7. Hereinafter, a description will be given along the respective steps.

At step S200, the controller 7 determines whether or not to switch to the internal combustion engine direct connection mode. Specifically, the controller 7 makes a determination by searching the map illustrated in FIG. 5 using an accelerator position and a vehicle speed. When the accelerator position is changed during travel in the series hybrid mode and a driving state determined by a driving force corresponding to an accelerator position after the change and a vehicle speed falls in the internal combustion engine direct connection mode range, the controller 7 determines to switch to the internal combustion engine direct connection mode.

The controller 7 performs a process of step S210 when the determination result of step S200 is yes, and repeatedly performs the process of step S200 when it is no.

At step S210, the controller 7 determines whether or not the vehicle speed is higher than a threshold value set in advance. The threshold value used in this step is a lower limit value of vehicle speed at which the rotation synchronization of the first clutch mechanism 19 when switching from the internal combustion engine direct connection mode to the series hybrid mode can be completed within an allowable time. As described above, as the vehicle speed increases, the time required for the rotation synchronization increases. Therefore, in terms of suppressing a reduction in drivability due to the increase in time required for the mode switching, an allowable value of the time required for the rotation synchronization is set, and based on this, a threshold value of vehicle speed is set. Specifically, the threshold value is set by adaptation according to the specification of the vehicle 1 to which this embodiment is applied.

When the determination result of step S210 is yes, i.e. when the time required for the rotation synchronization of the first clutch mechanism 19 when returning to the series hybrid mode becomes long enough to impair the drivability, a process of step S320 in FIG. 9, which will be described later, is performed. On the other hand, when the determination result of step S210 is no, a process of step S220 is performed.

At step S220, the controller 7 determines whether or not the accelerator operation frequency is higher than a threshold value set in advance. The accelerator operation frequency is, for example, the number of times of accelerator operations per unit time for the last several minutes. This step determines, based on the last accelerator operation frequency, the possibility that the accelerator position changes from now on, i.e. the possibility of returning to the series hybrid mode soon after switching to the internal combustion engine direct connection mode. The threshold value used in this step is set based on statistical data of accelerator operation frequency obtained by experiments or the like.

When the determination result of step S220 is yes, i.e. when the possibility of returning to the series hybrid mode soon is high, the process of step S320 in FIG. 9, which will be described later, is performed. On the other hand, when the determination result of step S220 is no, a process of step S230 is performed.

At step S230, the controller 7 determines whether or not a sports mode switch is on. When the determination result is yes, i.e. when the sports mode switch is on, the possibility is high that the accelerator position changes, and therefore, the process of step S320 in FIG. 9, which will be described later, is performed. On the other hand, when the determination result is no, a process of step S240 in FIG. 8 is performed. When the vehicle 1 does not include the sports mode switch, this step can be omitted.

First, the control routine of FIG. 8 will be described.

At step S240, the controller 7 determines to disengage the first clutch mechanism 19 in the internal combustion engine direct connection mode.

At step S250, the controller 7 issues a rotation synchronization command to the power generation motor 4. This is for causing the power generation motor 4 to perform power running so as to synchronize the rotation speed of the second sleeve 22 with the rotation speed of the fourth reduction gear 16 in the second clutch mechanism 21. Specifically, the controller 7 sets, as a target rotation speed of the power generation motor 4, a rotation speed lower than a rotation speed of the fourth reduction gear 16 by a determination rotation speed difference, and controls the power generation motor 4 based on the target rotation speed. The reason for setting the target rotation speed to be lower by the determination rotation speed difference is to suppress the overshoot. The determination rotation speed difference can be arbitrarily set in a range that does not impair the engagement of the drag clutch. The rotation speed of the fourth reduction gear 16 is calculated based on a rotation speed of the drive wheels 6 detected by the non-illustrated vehicle speed sensor, and the numbers of teeth of the differential gear 12, the sixth reduction gear 18, the fifth reduction gear 17, and the fourth reduction gear 16. The target rotation speed of the power generation motor 4 is calculated based on the rotation speed of the fourth reduction gear 16 and the numbers of teeth of the seventh reduction gear 13, the eighth reduction gear 14, and the ninth reduction gear 15.

At step S260, the controller 7 determines whether or not the rotation synchronization has been completed. Specifically, when the power generation motor 4 has reached the target rotation speed and this state has continued for a determination time set in advance, the controller 7 determines that the rotation synchronization has been completed. The controller 7 repeatedly performs this step until the rotation synchronization has been completed, and performs a process of step S270 when the rotation synchronization has been completed. The determination time is a time that can be arbitrarily set, and is set to about 0.1 seconds in this embodiment, taking into account the prevention of erroneous determination and the prevention of delay in the completion of mode switching.

At step S270, the controller 7 starts the engagement of the second clutch mechanism 21.

At step S280, the controller 7 determines whether or not the engagement of the second clutch mechanism 21 has been completed.

Specifically, when a stroke sensor (not illustrated) that detects the position of the second sleeve 22 detects that the second sleeve 22 has moved to a position at which the second sleeve 22 engages with the fourth reduction gear 16, the controller 7 determines that the engagement has been completed. The controller 7 repeats this step until the engagement has been completed, and performs a process of step S290 when the engagement has been completed.

The controller 7 issues a torque replacement command to the travel motor 2 and the internal combustion engine 3 at step S290 and issues a disengagement command to the first clutch mechanism 19 at step S300. The controller 7 may perform step S300 prior to step S290 or may perform step S290 and step S300 simultaneously.

The torque replacement referred to herein is an operation that, while keeping torque transmitted to the drive wheels 6 constant, reduces generation torque of the travel motor 2, increases generation torque of the internal combustion engine 3, and finally provides only the generation torque of the internal combustion engine 3. The reduction rate of the generation torque of the travel motor 2 and the increasing rate of the generation torque of the internal combustion engine 3 are set so that the torque replacement is completed in a short time, for example, about 0.2 seconds in this embodiment. The reduction rate of the generation torque of the travel motor 2 and the increasing rate of the generation torque of the internal combustion engine 3 at the time of the torque replacement may be set in advance.

The controller 7 determines at step S310 whether or not the first clutch mechanism 19 is in a disengaged state, and when it is in the disengaged state, the controller 7 ends this routine.

Next, the control routine of FIG. 9 will be described.

At step S320, the controller 7 determines not to disengage the first clutch mechanism 19 in the internal combustion engine direct connection mode.

Since processes of step S330 to step S370 are the same as the processes of step S250 to step S290 in FIG. 8, a description thereof is omitted. When the process of step S370 is completed, the controller 7 ends this routine.

Figure 10:
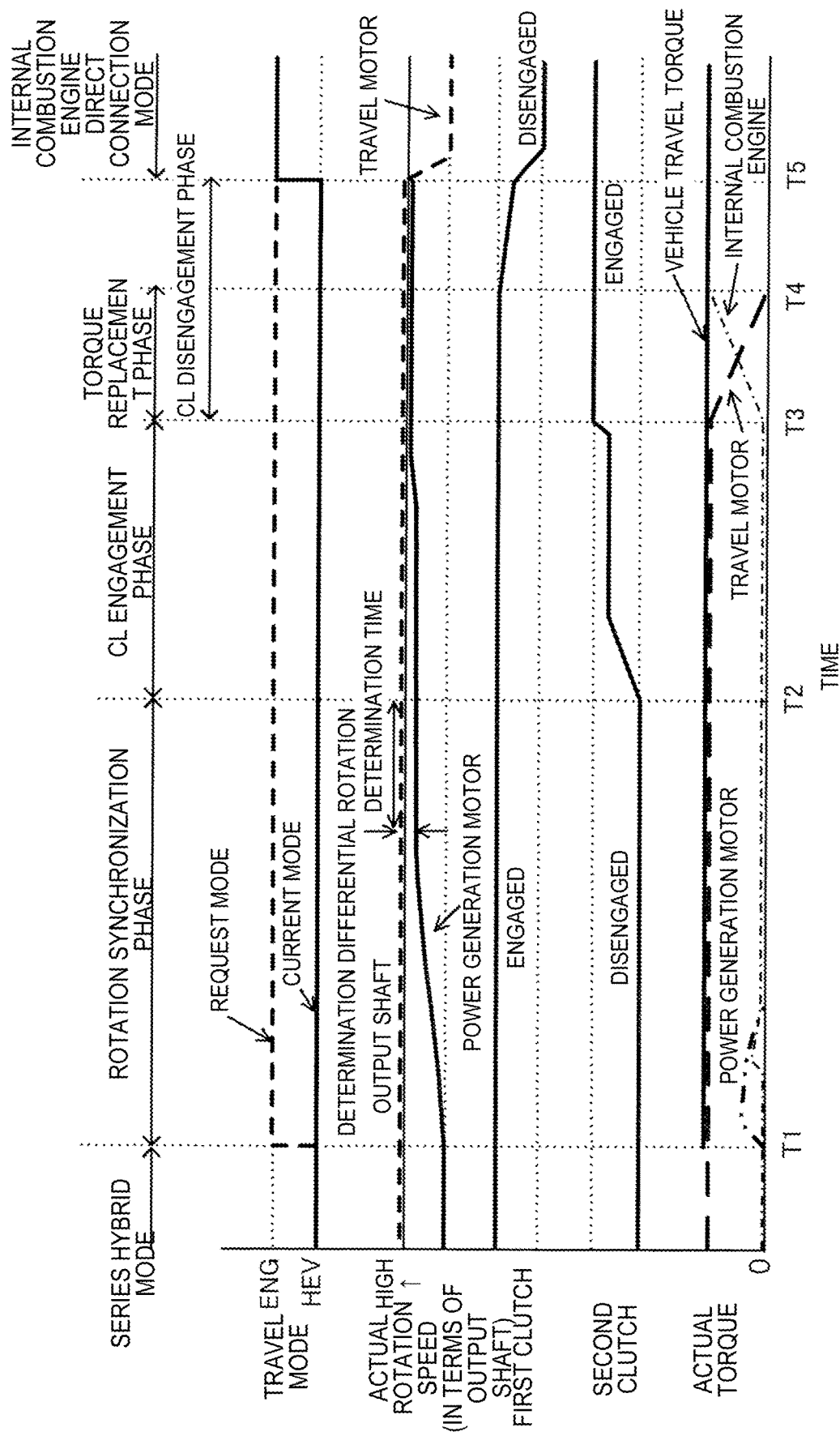
FIG. 10 is a timing chart when switching from the series hybrid mode to the internal combustion engine direct connection mode with disengagement of a first clutch mechanism.
Figure 11:
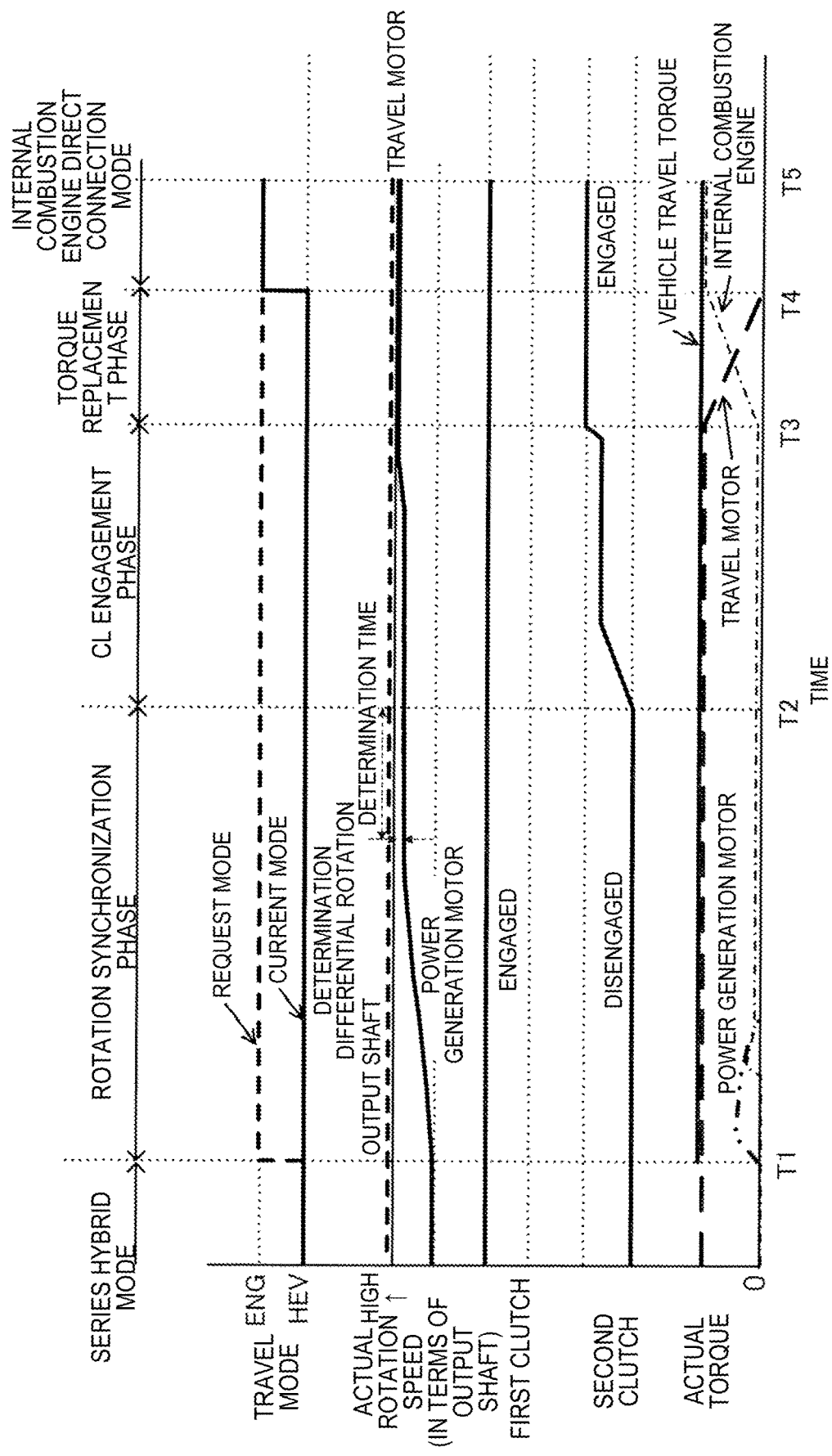
FIG. 11 is a timing chart when switching from the series hybrid mode to the internal combustion engine direct connection mode without disengagement of the first clutch mechanism.

FIGS. 10 and 11 illustrate timing charts when the control routine described above is performed.

FIG. 10 is a timing chart in the case where the first clutch mechanism 19 is disengaged, i.e. in the case where the control routine of FIG. 8 is performed, when switching from the series hybrid mode (HEV in the figure) to the internal combustion engine direct connection mode (ENG in the figure). Rotation speeds of the travel motor 2 and the power generation motor 4 in a chart of the actual rotation speed are values each converted to a rotation speed of the axle (output shaft) of the drive wheels 6 based on the reduction ratio provided by the respective reduction gears. The vertical axes of charts of the first clutch mechanism 19 and the second clutch mechanism 21 respectively represent the strokes of the first sleeve 20 and the second sleeve 22. Further, it is assumed that the internal combustion engine 3 is stopped during travel in the series hybrid mode.

When the controller 7 determines to disengage the first clutch mechanism 19 along with switching to the internal combustion engine direct connection mode (S240), the controller 7 issues a rotation synchronization command to the power generation motor 4 at time T1 (S250). Consequently, the rotation speed of the power generation motor 4 is increased.

Then, when the difference between the rotation speed of the power generation motor 4 and the rotation speed of the output shaft has reached the determination rotation speed difference and this state has continued for the determination time (yes at S260), the controller 7 issues an engagement command to the second clutch mechanism 21 at time T2 (S270). The period from time T1 to time T2 is defined as a rotation synchronization phase. The controller 7 starts the internal combustion engine 3 in the rotation synchronization phase. The started internal combustion engine 3 maintains an idling state during the rotation synchronization phase.

The second clutch mechanism 21 in receipt of the engagement command at time T2 starts an engagement operation. That is, the second sleeve 22 starts to move. Then, the second clutch mechanism 21 is in an engaged state at time T3 (yes at S280). The period from time T2 to time T3 is defined as a clutch engagement phase.

In the clutch engagement phase, the second clutch mechanism 21 approaches the engaged state stepwise. This is because there are a stage in which the second sleeve 22 comes into contact with the fourth reduction gear 16, a stage from the contact until a state where the convex portions of the second sleeve 22 and the convex portions of the engaging part 16A can be engaged with each other, and a stage in which, after being engageable, the second sleeve 22 further advances toward the fourth reduction gear 16.

When the clutch engagement phase has been completed, the controller 7 starts a torque replacement and a disengagement operation of the first clutch mechanism 19 (S290, S300). Consequently, while keeping constant the total torque (vehicle travel torque in the figure) of torque of the travel motor 2 and torque of the internal combustion engine 3, the torque of the travel motor 2 is reduced and the torque of the internal combustion engine 3 is increased. The period from time T3 to time T4 at which the torque of the travel motor 2 becomes zero is defined as a torque replacement phase.

Note that although the controller 7 issues the disengagement command to the first clutch mechanism 19 at time T3, the first clutch mechanism 19 is kept engaged until the end of the torque replacement phase. This is because since the torque of the travel motor 2 is applied, the first sleeve 20 does not come off the engaging part 8A of the first reduction gear 8.

At time T5 at which the first sleeve 20 has moved to a position at which the first sleeve 20 is out of contact with the engaging part the controller 7 determines that the disengagement of the first clutch mechanism 19 has been completed (S310). The period from time T3 to time T5 is defined as a clutch disengagement phase. When the clutch disengagement phase is completed, the switching from the series hybrid mode to the internal combustion engine direct connection mode is completed.

FIG. 11 is a timing chart in the case where the first clutch mechanism 19 is not disengaged, i.e. in the case where the control routine of FIG. 9 is performed, when switching from the series hybrid mode (HEV in the figure) to the internal combustion engine direct connection mode (ENG in the figure). Rotation speeds of the travel motor 2 and the power generation motor 4 in a chart of the actual rotation speed are values each converted to a rotation speed of the axle (output shaft) of the drive wheels 6 based on the reduction ratio provided by the respective reduction gears. The vertical axes of charts of the first clutch mechanism 19 and the second clutch mechanism 21 respectively represent the strokes of the first sleeve 20 and the second sleeve 22. Further, it is assumed that the internal combustion engine 3 is stopped during travel in the series hybrid mode.

The difference between the timing chart of FIG. 11 and the timing chart of FIG. 10 is the presence/absence of the clutch disengagement phase. That is, since the first clutch mechanism 19 is not disengaged in FIG. 11, there is no clutch disengagement phase. Therefore, FIG. 11 is the same as FIG. 10 until time T4, and when the torque replacement phase is completed at time T4, the switching from the series hybrid mode to the internal combustion engine direct connection mode is completed.

Herein, the case of switching from the internal combustion engine direct connection mode to the series hybrid mode will be described with reference to timing charts of FIGS. 12 and 13.

Figure 12:
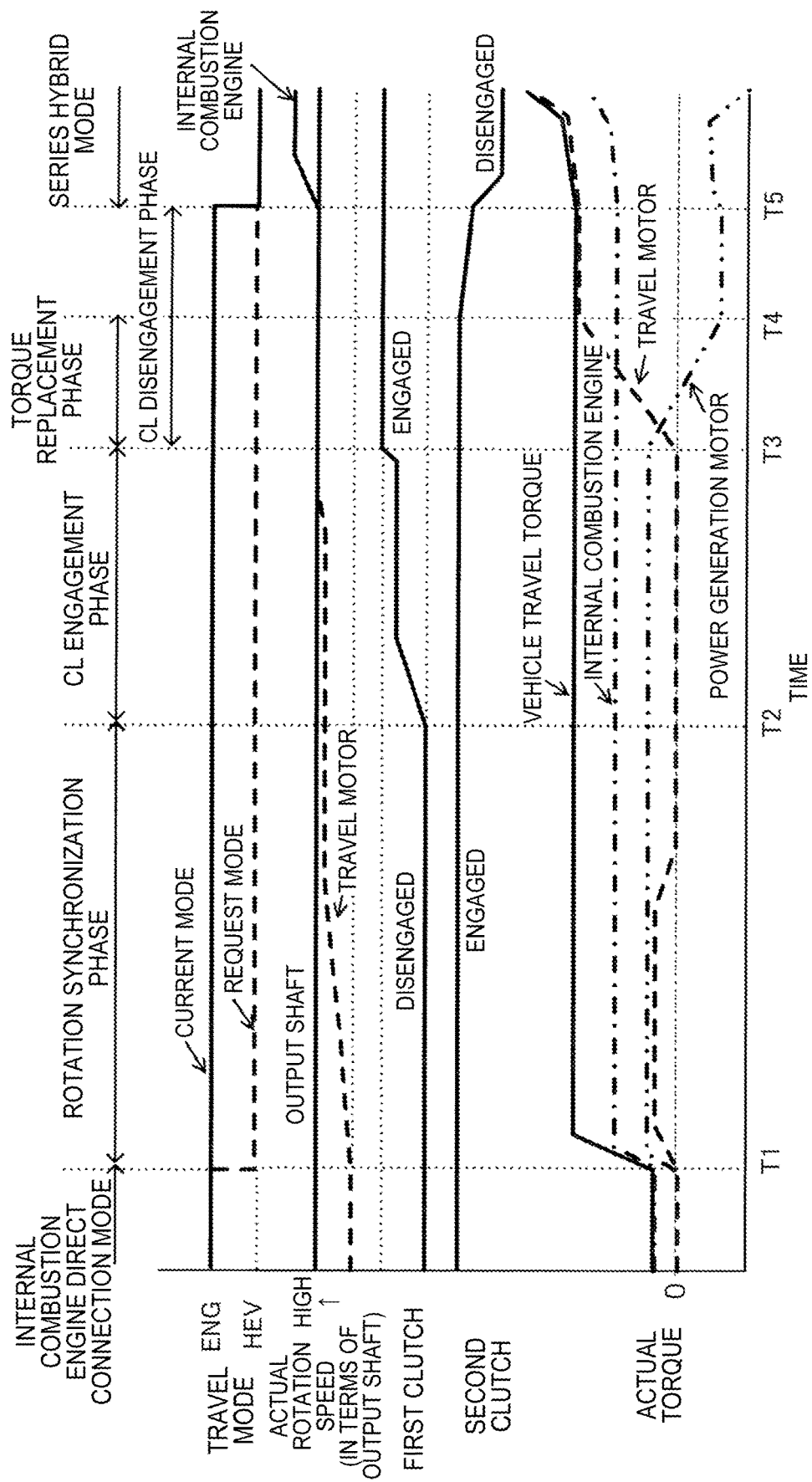
FIG. 12 is a timing chart when switching from the internal combustion engine direct connection mode with disengagement of the first clutch mechanism to the series hybrid mode.

FIG. 12 is a timing chart when switching to the series hybrid mode such that an accelerator pedal is depressed during travel in the internal combustion engine direct connection mode with the first clutch mechanism 19 being in a disengaged state.

Switching periods include a rotation synchronization phase, a clutch engagement phase, a torque replacement phase, and a clutch disengagement phase, which is the same as in FIG. 10. However, the rotation speed of the travel motor 2 is synchronized in the rotation synchronization phase, the first clutch mechanism 19 is engaged in the clutch engagement phase, and the second clutch mechanism 21 is disengaged in the clutch disengagement phase. Hereinafter, the respective phases will be described.

When the rotation synchronization phase is started at time T1, the controller 7 increases the rotation speed of the travel motor 2. Then, the rotation speed of the travel motor 2 reaches a rotation speed lower than a rotation speed of the output shaft by a determination rotation speed difference, and at time T2 at which this state has continued for a determination time, the rotation synchronization phase is completed. The determination rotation speed difference and the determination time are the same as in the switching from the series hybrid mode to the internal combustion engine direct connection mode.

In the clutch engagement phase, the controller 7 switches the first clutch mechanism 19 from its disengaged state to its engaged state. In this event, the engaged state advances stepwise like in the switching from the series hybrid mode to the internal combustion engine direct connection mode.

In the torque replacement phase, the controller 7 increases torque of the travel motor 2 and reduces torque of the power generation motor 4 so as to generate the power generation resistance. In this event, the controller 7 keeps torque of the internal combustion engine 3 constant. Since the power generation resistance of the power generation motor 4 is increased, even when the torque of the internal combustion engine 3 is kept constant, the torque transmitted from the internal combustion engine 3 to the drive wheels 6 is reduced. Then, at time T4 at which the torque of the travel motor 2 has reached vehicle travel torque, the torque replacement phase is completed.

In the clutch disengagement phase, like in the switching from the series hybrid mode to the internal combustion engine direct connection mode, the second sleeve 22 does not come off the engaging part 16A while the torque is applied, and the second sleeve 22 starts to move after the torque replacement is completed. Then, at time T5 at which the second sleeve 22 is separated from the engaging part 16A, the clutch disengagement phase is completed.

Figure 13:
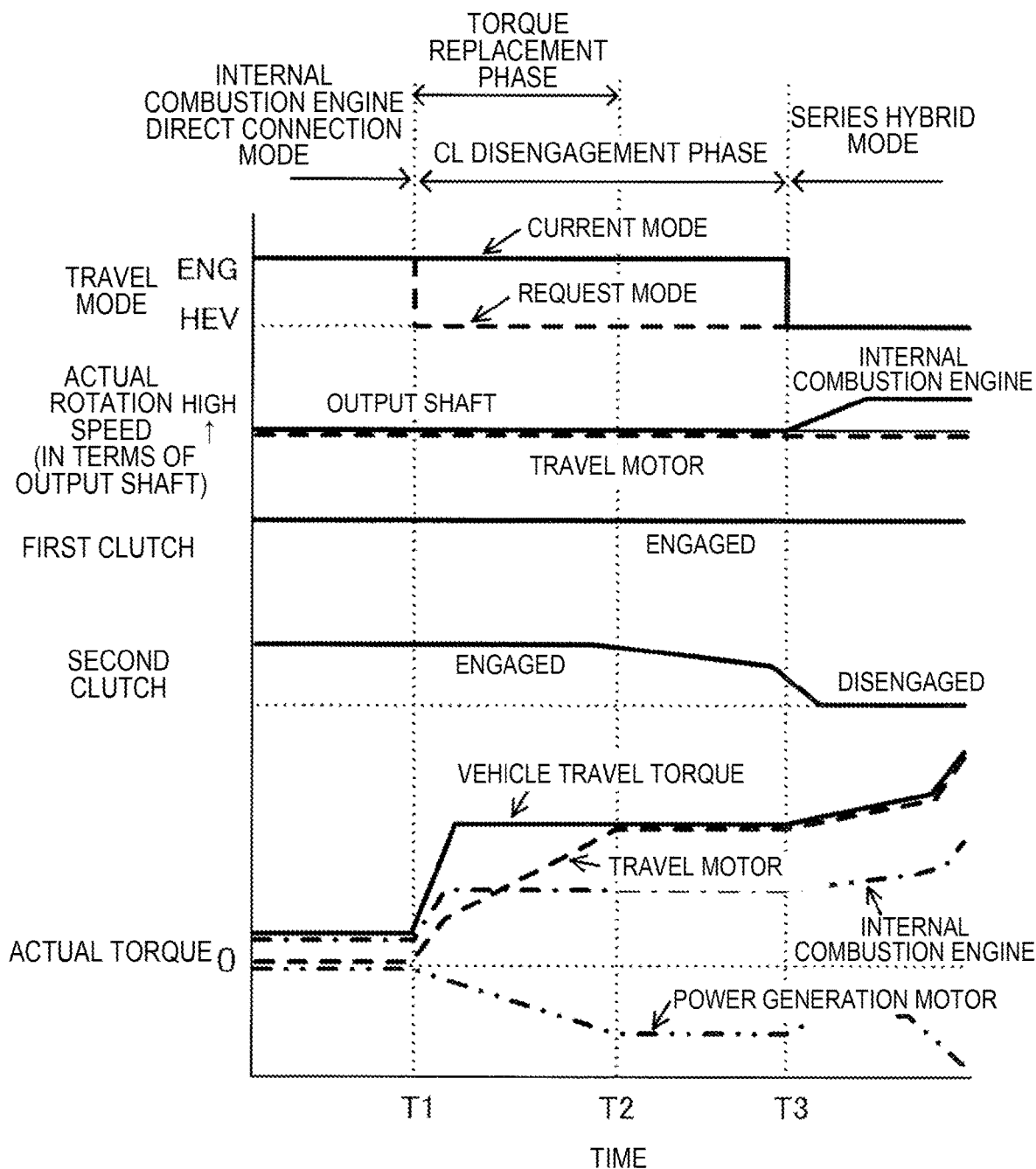
FIG. 13 is a timing chart when switching from the internal combustion engine direct connection mode without disengagement of the first clutch mechanism to the series hybrid mode.

FIG. 13 is a timing chart when switching to the series hybrid mode (HEV in the figure) such that the accelerator pedal is depressed during travel in the internal combustion engine direct connection mode (ENG in the figure) with the first clutch mechanism 19 being in an engaged state.

In this case, since the first clutch mechanism 19 is engaged in the internal combustion engine direct connection mode, the rotation synchronization phase and the clutch engagement phase are unnecessary. That is, switching periods are composed of a torque replacement phase and a clutch disengagement phase that disengages the second clutch mechanism 21. The contents of the torque replacement phase and the clutch disengagement phase are the same as the contents of those phases in FIG. 12.

Next, the effects of this embodiment will be summarized.

In this embodiment, the following effects can be obtained in addition to the effects obtained by including the first clutch mechanism 19, which have been described in the first embodiment.

The power transmission device of this embodiment further includes the controller 7 (the control unit) that controls the first clutch mechanism 19 and the second clutch mechanism 21. In the implementation of the internal combustion engine direct connection mode in which the second clutch mechanism 21 is engaged to drive the drive wheels 6 by the power of the internal combustion engine 3, the controller 7 disengages the first clutch mechanism 19 as a rule and engages the first clutch mechanism 19 when a predetermined condition is established. When a predetermined condition is established, referred to herein, is when the possibility is high that switching to the series hybrid mode becomes necessary soon. According to this embodiment, when the possibility is high that the internal combustion engine direct connection mode continues for a while, the first clutch mechanism 19 is disengaged so that the co-rotation of the travel motor 2 does not occur. On the other hand, when the predetermined condition is established, the first clutch mechanism 19 is kept engaged so that the time required for switching from the internal combustion engine direct connection mode to the series hybrid mode is shortened compared to the case of switching from the state where the first clutch mechanism 19 is disengaged.

In this embodiment, the controller 7 determines based on the vehicle speed whether or not the predetermined condition is established. For example, when the first clutch mechanism 19 is disengaged in a high vehicle speed state, the rotation synchronization of the first clutch mechanism 19 takes time when switching to the series hybrid mode again, and therefore, it is not possible to perform quick switching. In view of this, in the high vehicle speed state, the controller 7 determines that the predetermined condition is established, and does not disengage the first clutch mechanism 19. On the other hand, the rotation synchronization of the first clutch mechanism 19 is completed in a short time in a low vehicle speed state. Therefore, in the low vehicle speed state, the controller 7 determines that the predetermined condition is not established, and disengages the first clutch mechanism 19 according to the rule. As described above, by determining based on the vehicle speed whether or not the predetermined condition is established, it is possible to suppress the prolongation of the switching time from the internal combustion engine direct connection mode to the series hybrid mode.

In this embodiment, the controller 7 determines whether or not the predetermined condition is established, based on the state of an acceleration/deceleration request. For example, when acceleration requests occur frequently, the controller 7 determines that the predetermined condition is established. In such a case, by keeping the first clutch mechanism 19 engaged even in the internal combustion engine direct connection mode, it is possible to quickly switch to the series hybrid mode.

In this embodiment, the controller 7 determines the state of the acceleration/deceleration request based on the accelerator operation state. The accelerator operation state is, for example, the accelerator operation frequency, i.e. the number of times of accelerator operations per unit time. Consequently, it is possible to properly determine the possibility of returning to the series hybrid mode.

In this embodiment, the controller 7 determines the state of the acceleration/deceleration request based on the state of a travel mode switching switch. For example, when a sports mode is selected by the travel mode switch, the possibility is high that a driver intends positive acceleration/deceleration. Therefore, when the sports mode is selected, the controller 7 determines that the predetermined condition is established. Consequently, it is possible to properly determine the possibility of returning to the series hybrid mode.

While the embodiments of the present invention have been described above, the above-described embodiments only show part of application examples of the present invention and are not intended to limit the technical scope of the present invention to the specific configurations of the above-described embodiments.

The invention claimed is:

1. A power transmission device for a vehicle, the vehicle including:
- a generator configured to be driven by power of an internal combustion engine;
- a travel motor configured to be driven by electric power generated by the generator and to drive a drive wheels; and
- the drive wheels configured to be driven by the power of the internal combustion engine or power of the travel motor, wherein the power transmission device comprises:
- a first power transmission path configured to transmit power between the travel motor and the drive wheels;
- a first dog clutch mechanism configured to allow or interrupt power transmission through the first power transmission path;
- a second power transmission path configured to mechanically transmit the power of the internal combustion engine to the drive wheels;
- a second dog clutch mechanism configured to allow or interrupt power transmission through the second power transmission path; and
- a control unit configured to control the travel motor, the first dog clutch mechanism, and the second dog clutch mechanism, and wherein the control unit is configured to, in implementation of an internal combustion engine direct connection mode in which the drive wheels are driven by the power of the internal combustion engine in a disengaged state of the first dog clutch mechanism and an engaged state of the second dog clutch mechanism, rotationally drive the travel motor within a range in which a travel motor side rotation speed of the first dog clutch mechanism becomes lower than a drive wheels side rotation speed of the first dog clutch mechanism, and configured to rotationally synchronize the travel motor side rotation speed with the drive wheels side rotation speed when switching the first dog clutch from the disengaged state to an engaged state after an end of the internal combustion engine direct connection mode.

2. The power transmission device for the vehicle according to claim 1, wherein a third power transmission path between the internal combustion engine and the generator is always in a state where power is transmitted.

3. The power transmission device for the vehicle according to claim 2, wherein the control unit is configured to control a rotation speed of the travel motor in the implementation of the internal combustion engine direct connection mode according to a vehicle speed.

4. The power transmission device for the vehicle according to claim 2, wherein the control unit is configured to control a rotation speed of the travel motor in the implementation of the internal combustion engine direct connection mode according to a state of charge of a battery.

* * * * *